US008714295B2

(12) United States Patent
Hayman et al.

(10) Patent No.: US 8,714,295 B2
(45) Date of Patent: May 6, 2014

(54) INTERNAL COMBUSTION ENGINE AND VEHICLE PACKAGING FOR SAME

(75) Inventors: Alan W. Hayman, Romeo, MI (US); James J. Mazzola, III, Dryden, MI (US); William A. Bear, Novi, MI (US)

(73) Assignee: GM Global Technology Operations LLC, Detroit, MI (US)

(*) Notice: Subject to any disclaimer, the term of this patent is extended or adjusted under 35 U.S.C. 154(b) by 192 days.

(21) Appl. No.: 13/005,758

(22) Filed: Jan. 13, 2011

(65) Prior Publication Data

US 2011/0174566 A1 Jul. 21, 2011

Related U.S. Application Data

(60) Provisional application No. 61/295,257, filed on Jan. 15, 2010.

(51) Int. Cl.
*B60K 1/00* (2006.01)

(52) U.S. Cl.
USPC .......... 180/291; 180/69.1; 180/292; 180/293; 180/294; 180/295; 180/296; 180/297; 180/298; 180/299; 180/300

(58) Field of Classification Search
USPC ......... 180/291, 292, 293, 294, 295, 296, 297, 180/298, 299, 300, 69.1
See application file for complete search history.

(56) References Cited

U.S. PATENT DOCUMENTS

| | | | |
|---|---|---|---|
| 3,109,416 | A | 11/1963 | Rose et al. |
| 3,791,144 | A | 2/1974 | Lang |
| 4,037,408 | A | 7/1977 | Ozawa |
| 4,086,763 | A | 5/1978 | Matsushita et al. |
| 4,106,471 | A | 8/1978 | Nakajima et al. |
| 4,114,373 | A | 9/1978 | Sakai et al. |
| 4,123,902 | A | 11/1978 | Iida |
| 4,177,640 | A | 12/1979 | Kuroda et al. |
| 4,218,880 | A | 8/1980 | Kuroda et al. |
| 4,258,547 | A | 3/1981 | Fenn |
| 4,262,639 | A | 4/1981 | Motosugi et al. |

(Continued)

FOREIGN PATENT DOCUMENTS

| | | | |
|---|---|---|---|
| CN | 1416502 | A | 5/2003 |
| DE | 60020493 | T2 | 10/2005 |

(Continued)

OTHER PUBLICATIONS

Chinese Office Action for Application No. 201110052804.2 dated Apr. 9, 2013; 8 pages.

*Primary Examiner* — J. Allen Shriver, II
*Assistant Examiner* — Hilary L Johns
(74) *Attorney, Agent, or Firm* — Cantor Colburn LLP

(57) ABSTRACT

A motor vehicle has an internal combustion engine mounted in a central tunnel of the vehicle floor pan. The internal combustion engine comprises an engine block assembly having a lower end closed by an oil pan and an upper end extending at an angle α from a rear of the engine block assembly to a front thereof. An engine block closes the upper end and defines a crankcase that is configured to house a crankshaft for rotation therein. A cylinder housing assembly is reclined from vertical, towards the rear of the engine block, about an axis of the crankshaft by an angle β. At least a portion of the cylinder housing assembly and the crankcase are disposed in the central tunnel of the vehicle floor pan.

20 Claims, 6 Drawing Sheets

(56) References Cited

U.S. PATENT DOCUMENTS

| | | | | |
|---|---|---|---|---|
| 4,480,600 | A | 11/1984 | Gill | |
| 4,805,403 | A | 2/1989 | Bowman et al. | |
| 4,889,083 | A | 12/1989 | Honma et al. | |
| 5,003,932 | A | 4/1991 | Duncan | |
| 5,046,578 | A * | 9/1991 | Nakayama et al. | 180/291 |
| 5,181,491 | A | 1/1993 | Izumi et al. | |
| 5,339,918 | A * | 8/1994 | Nakayama et al. | 180/292 |
| 5,492,088 | A | 2/1996 | Ohrnberger | |
| 5,531,291 | A * | 7/1996 | Sato et al. | 180/297 |
| 5,613,470 | A | 3/1997 | Shiomi et al. | |
| 5,630,386 | A | 5/1997 | Uchida | |
| 5,660,154 | A | 8/1997 | Fields | |
| 5,901,677 | A | 5/1999 | Ohrnberger et al. | |
| 6,095,105 | A | 8/2000 | Lohr et al. | |
| 6,161,513 | A | 12/2000 | Lohr et al. | |
| 6,357,401 | B1 | 3/2002 | Moriyama et al. | |
| 6,510,912 | B1 * | 1/2003 | Atsuumi | 180/69.1 |
| 6,745,730 | B2 | 6/2004 | Yamashita | |
| 6,941,914 | B2 | 9/2005 | Snyder et al. | |
| 7,070,526 | B2 * | 7/2006 | Lawrence | 474/87 |
| 7,131,416 | B2 | 11/2006 | Sasaki et al. | |
| 7,757,655 | B2 | 7/2010 | Inui et al. | |
| 7,770,555 | B2 * | 8/2010 | Matsuda | 123/192.2 |
| 7,827,955 | B2 * | 11/2010 | Matsuda et al. | 123/195 AC |
| 2003/0019464 | A1 | 1/2003 | Morii et al. | |
| 2004/0206567 | A1 * | 10/2004 | Kato et al. | 180/291 |
| 2005/0006168 | A1 * | 1/2005 | Iwasaka et al. | 180/292 |
| 2005/0257765 | A1 | 11/2005 | Saitoh et al. | |
| 2006/0144354 | A1 | 7/2006 | Tanaka et al. | |
| 2006/0283418 | A1 * | 12/2006 | Matsuda et al. | 123/197.1 |
| 2008/0210189 | A1 | 9/2008 | Boyes et al. | |
| 2011/0209937 | A1 * | 9/2011 | Belzile et al. | 180/291 |

FOREIGN PATENT DOCUMENTS

| | | | | |
|---|---|---|---|---|
| DE | 102008020423 | A1 | 10/2009 | |
| JP | 2000274321 | A | 10/2000 | |
| WO | 2009096977 | A1 | 8/2009 | |
| WO | WO 2009096977 | A1 * | 8/2009 | B60K 11/00 |

* cited by examiner

INTERNAL COMBUSTION ENGINE AND VEHICLE PACKAGING FOR SAME

CROSS-REFERENCES TO RELATED APPLICATIONS

This patent application claims priority to U.S. Provisional Patent Application Ser. No. 61/295,257 filed Jan. 15, 2010 which is hereby incorporated herein by reference in its entirety.

FIELD OF THE INVENTION

Exemplary embodiments of the present invention relate to modular or common engine designs and, more specifically, to an inline 2-cylinder engine and related V-configured 3-cylinder engine and related vehicle packaging therefore.

BACKGROUND

Environmental sustainability, increasing global energy demands and the resulting rise in fuel cost and relatively new demand in developing economies for independent but less costly transportation is driving vehicle and powertrain designers towards smaller and more fuel efficient vehicles. It is not uncommon to find inline 3 and 4 cylinder engines powering many medium to small sized vehicles. However, these engines are length constrained by their inline cylinder configurations which operate to define the minimum vehicle architectural space in which they may be packaged. Narrow angle V-configured engines offer some additional packaging advantages by staggering pistons in offset banks, offering additional pistons and resulting power, without unnecessarily increasing the length of the engine package. However, engine height may suffer in such engines due to the use of a single cylinder head having a height beyond that required for an inline engine.

SUMMARY OF THE INVENTION

In an exemplary embodiment, a motor vehicle has an internal combustion engine mounted in the central tunnel of the vehicle floor pan. The internal combustion engine comprises an engine block assembly having a lower end closed by an oil pan and an upper end extending at an angle α from a rear of the engine block assembly to a front thereof, an engine block closing the upper end and defining a crankcase that is configured to house a crankshaft for rotation therein and a cylinder housing assembly reclined from vertical, towards the rear of the engine block, about an axis of the crankshaft by an angle β. At least a portion of the cylinder housing assembly and the crankcase are disposed in the central tunnel of the vehicle floor pan.

In another exemplary embodiment a motor vehicle comprises a vehicle floor pan, a central tunnel defined at an end of the vehicle floor pan and an internal combustion engine mounted in the central tunnel of the vehicle floor pan. The internal combustion engine comprises an engine block assembly having a lower end closed by an oil pan and an upper end extending at an angle α from a rear of the engine block assembly to a front thereof, an engine block closing the upper end and defining a crankcase that is configured to house a crankshaft for rotation therein and a cylinder housing assembly reclined from vertical, towards the rear of the engine block, about an axis of the crankshaft by an angle β, wherein at least a portion of the cylinder housing assembly and the crankcase are disposed in the central tunnel of the vehicle floor pan.

The above features and advantages, and other features and advantages of the invention are readily apparent from the following detailed description of the invention when taken in connection with the accompanying drawings.

DESCRIPTION OF THE DRAWINGS

Other objects, features, advantages and details appear, by way of example only, in the following detailed description of the embodiments, the detailed description referring to the drawings in which.

DESCRIPTION OF THE EMBODIMENTS

Figure 1:
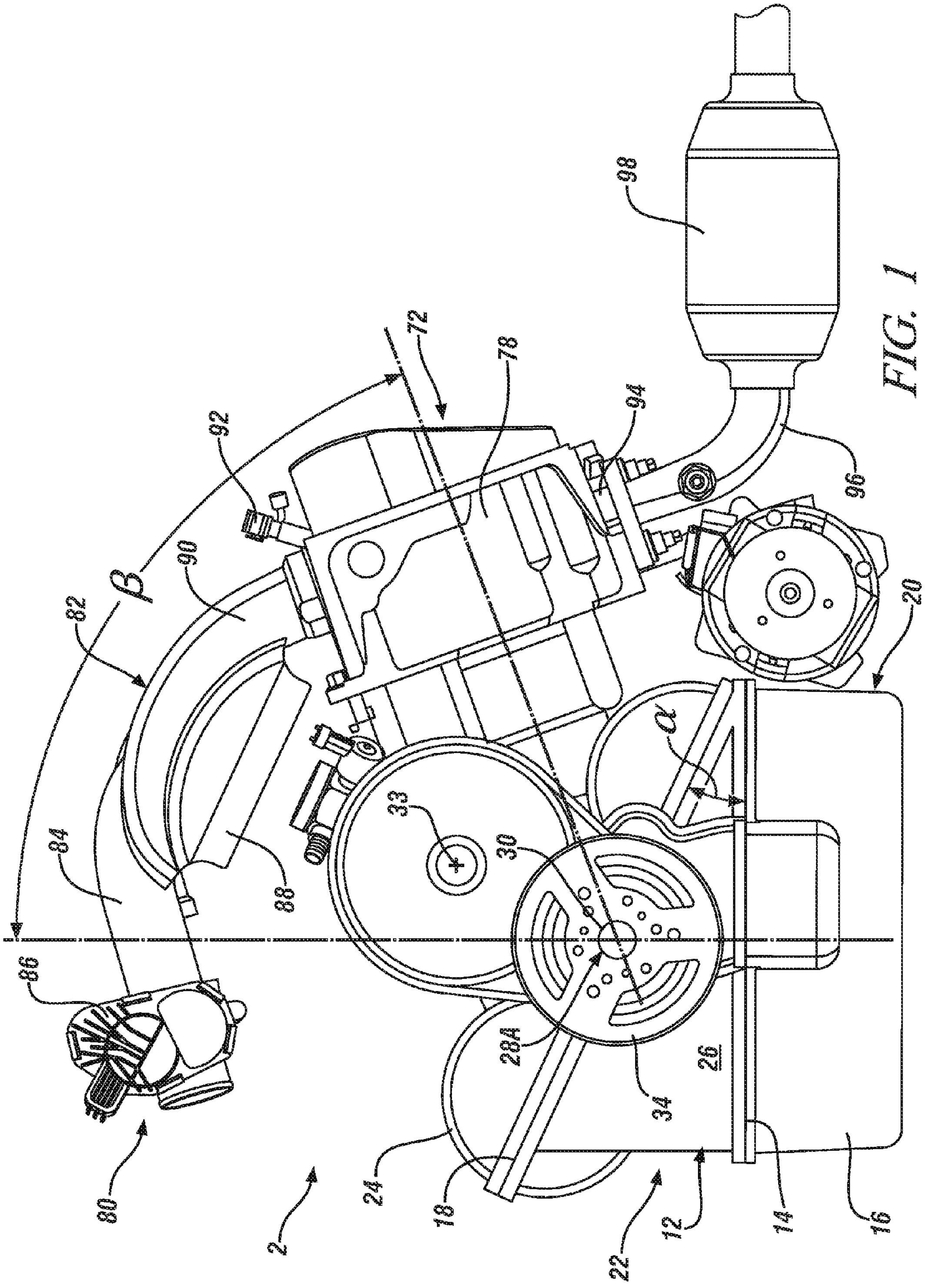
FIG. 1 is a side view of an inline 2-cylinder engine embodying features of the invention.

The following description is merely exemplary in nature and is not intended to limit the present disclosure, its application or uses. It should be understood that throughout the drawings, corresponding reference numerals indicate like or corresponding parts and features.

Figure 2:
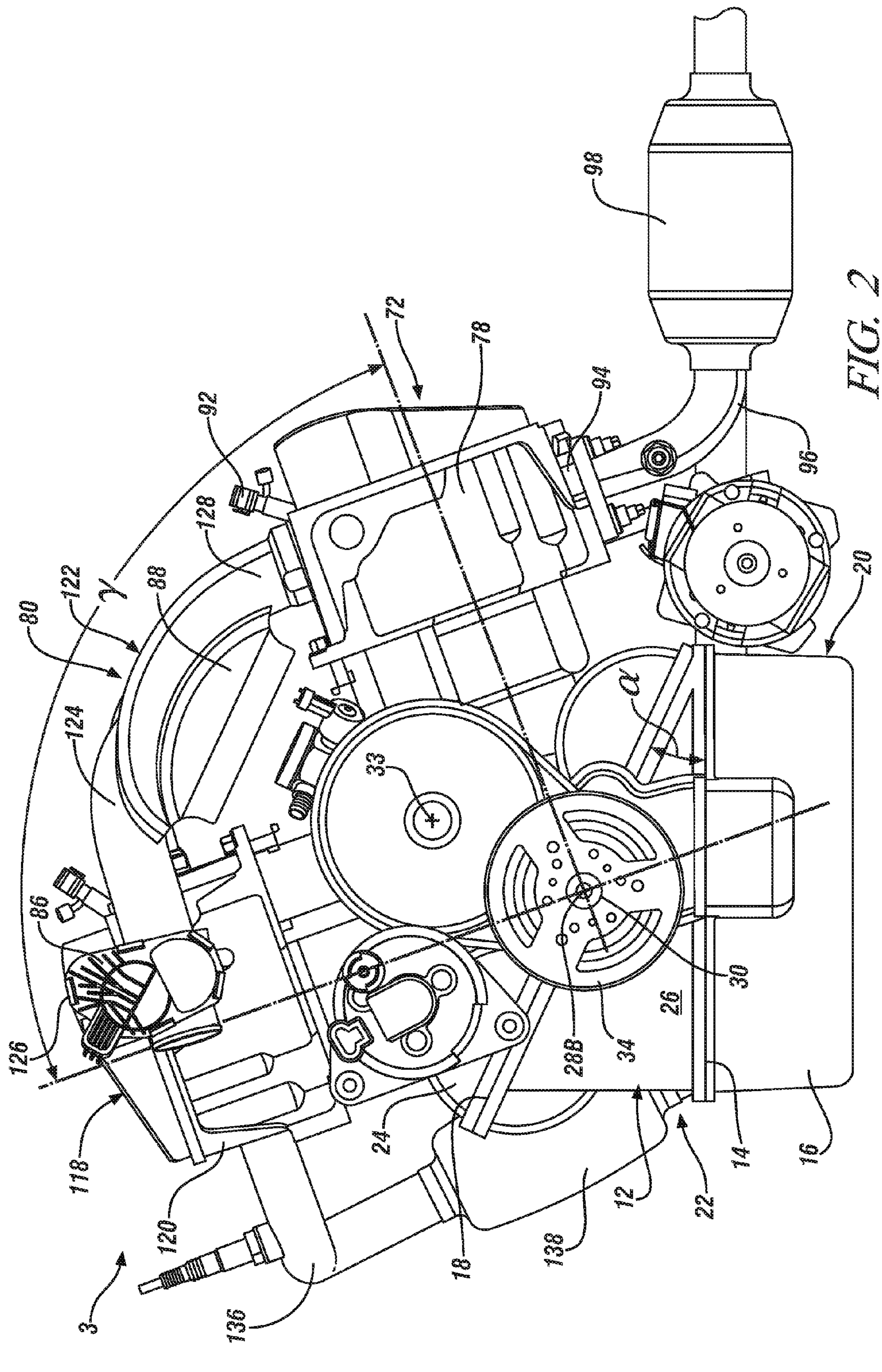
FIG. 2 is side view of a V-configured 3-cylinder engine embodying features of the invention.

Referring to FIGS. 1 and 2, in an exemplary embodiment there is shown a family of modular or common engines that includes an inline configured 2-cylinder engine 2, FIG. 1, and a V-configured 3-cylinder engine 3, FIG. 2. In the various figures, like features that are shared between the inline 2-cylinder engine 2 and the V-configured 3-cylinder engine 3 have like numbers assigned thereto. The engines 2 and 3 include engine block assemblies 12 having an open lower portion or rim 14 that is closed by an oil reservoir or pan 16. The upper ends 18 of the engine block assemblies 12 extend at an angle "α" from the rear 20 of the engines 2, 3 to the front 22 of the engines and are closed by an engine block 24. The combination of the engine block assembly 12, the oil pan 16 and the engine block 24 defines a crankcase 26 that houses and supports crankshafts 28A or 28B (28A=2-cylinder engine 2 and 28B=3-cylinder engine 3 for rotation therein. The crankshafts 28A or 28B are coupled by a belt, chain or gear drive to rotatably operate a camshaft defining a camshaft axis 33.

As illustrated in FIG. 1, in an exemplary embodiment, the inline configured 2 cylinder engine 2 comprises a crankshaft 28A that includes a crank snout 30 at a first end. The crank snout 30 extends outwardly of the front of the engine block assembly 12 and supports a crankshaft pulley 34 thereon. A flywheel (not shown) may be disposed at a second end of the crankshaft 28A and may be configured to engage an associated transmission assembly 60, FIG. 3, as well as other related engine assemblies as may be required (ex. starter motor, for instance). Gear driven balance shafts 27 may be mounted for rotation within the crankcase 26 and operate to reduce vibration caused by natural imbalances in the 2 cylinder inline design. In an exemplary embodiment engine cylinders (not shown) are disposed within a cylinder housing assembly 72 of engine block 24 for reciprocation therein. Closing the upper end of the cylinder housing assembly 72 is a cylinder head 78.

In an exemplary embodiment, an intake assembly 80 is configured to conduct combustion air to intake ports (not shown). The intake assembly 80 comprises an intake manifold 82 having an inlet runner 84 for receiving metered combustion air through a throttle body 86. The inlet runner 84 fluidly connects with, and delivers combustion air to, a central plenum 88 of the intake manifold 82 where the combustion air is distributed to intake runners 90 that are fluidly connected to the cylinder head 78. An exhaust manifold 94 is also fluidly connected with the cylinder head 78 and is configured to remove combustion products therefrom. The combustion by-products flow through an exhaust system conduit 96 that is configured to receive the combustion by-products from the exhaust manifold 94 and to transfer the combustion by-products to various exhaust gas after treatment devices, such as the close-coupled catalytic converter 98, for oxidation, reduction or other conversion of regulated exhaust gas constituents in the combustion by-products prior to their release to the atmosphere.

Figure 3:
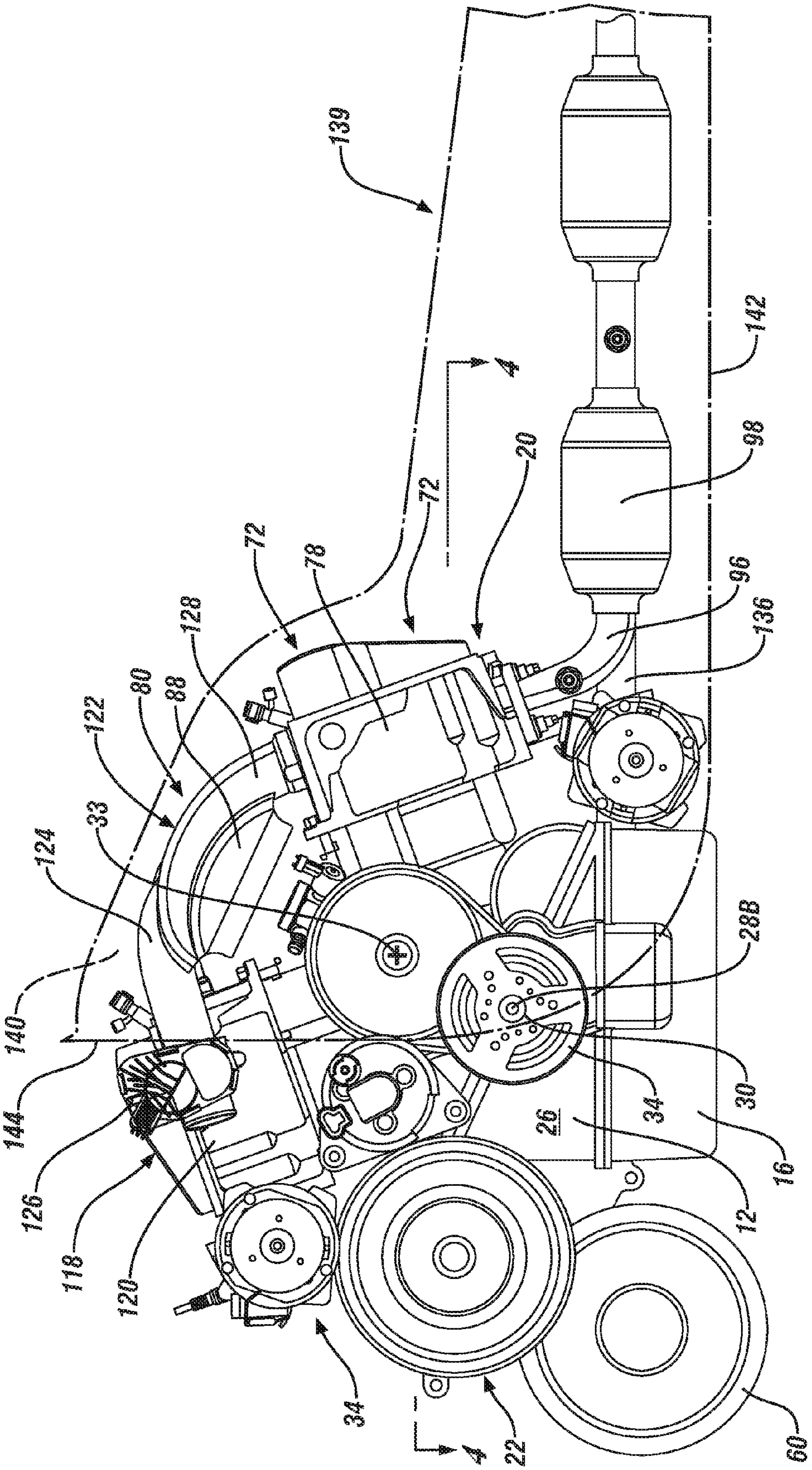
FIG. 3 is a side view of the V-configured 3-cylinder engine of FIG. 2 with a partial vehicle installation illustrated in phantom.
Figure 5:
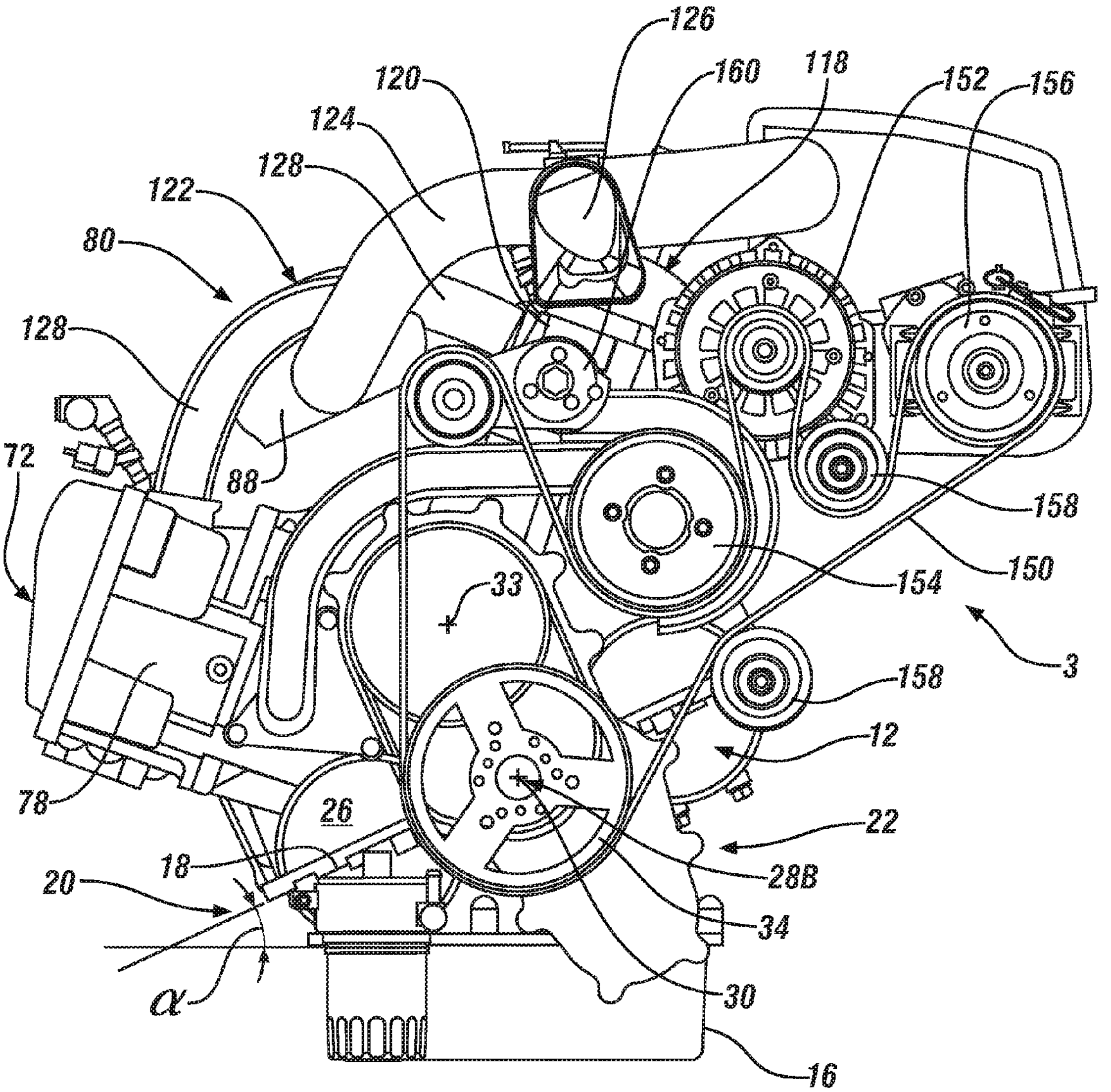
FIG. 5 is a side view of another embodiment of a V-configured 3-cylinder engine embodying features of the invention.

Referring to FIGS. 2, 3 and 5, in exemplary embodiments the V-configured 3-cylinder engine 3 includes the engine block assembly 12 having an open lower portion or rim 14 that is closed by an oil reservoir or oil pan 16. The upper end 18 of the engine block assembly 12 extends at an angle "α" from the rear of the engine 20 to the front of the engine 22 and is closed by an engine block 24. It is contemplated that the angle α may vary in a range from about 0° to about 45° depending upon the particular vehicle configuration and other application driven variables. In the particular embodiment shown, the angle α is in the range of about 45°. The combination of the engine block assembly 12, the oil pan 16 and the engine block 24 define a crankcase 26 that houses and supports a crankshaft 28B for rotation therein. The crankshaft 28B is coupled by a belt, chain or gear drive to rotatably operate a camshaft (not shown) defining a camshaft axis 33. The camshaft acts upon pushrods (not shown) that extend into cylinder heads 78 and 120 for operation of valve gear (not shown) disposed therein.

In one exemplary embodiment, the crankshaft 28B comprises a crank snout 30 at a first end. The crank snout 30 extends outwardly of the front of the engine block assembly 12 and supports a crankshaft pulley 34 thereon. Referring to FIG. 5, the crankshaft pulley 34 is connected via an accessory drive belt 150 to various engine driven accessories such as an alternator 152, an air conditioner compressor 154, an air pump 156 or a combination thereof Idler pulleys 158 and tensioner assemblies 160 provide tension and direct the accessory drive belt 150 in a serpentine manner enabling it to impart rotation on the various engine driven accessories through the rotation of the crankshaft 28B and the crankshaft pulley 34.

A flywheel (not shown) may be disposed at a second end of the crankshaft 28B and may be configured to engage an associated transmission assembly 60, FIG. 3, as well as other related engine assemblies as may be required (ex. starter motor, for instance). One or more gear driven balance shafts (not shown) may be disposed for rotation within the crankcase 26 and operate to reduce vibration caused by natural imbalances in the 3-cylinder V-configured design.

Referring again to the FIGS. 2, 3 and 5, in an exemplary embodiment two engine cylinders (not shown) are disposed within a cylinder housing assembly 72 for reciprocation therein. Additionally, a third engine cylinder (not shown) is disposed within a cylinder housing assembly 118 of engine block 24 for reciprocation therein. Closing the upper end of the cylinder housing assembly 72 is a cylinder head 78 and closing the upper end of the cylinder housing assembly 118 is a cylinder head 120. A low profile intake assembly 80 is configured to conduct combustion air to the cylinder heads 78, 120. The intake assembly 80 comprises an intake manifold 122 having an inlet runner 124 for receiving metered combustion air through a throttle body 126. The inlet runner 124 fluidly connects with and delivers combustion air to a central plenum 88 of the intake manifold 80 where the combustion air is distributed to a plurality of intake runners 128 that are fluidly connected to the cylinder heads 78 and 120. A second exhaust manifold (not shown) is also fluidly connected with the cylinder head 120 and is configured to remove combustion by-products therefrom. The combustion by-products flow through an exhaust system conduit 136, FIG. 2, that is configured to receive the combustion by-products from the second exhaust manifold and to conduct the exhaust gas through the exhaust system conduit 136 where it is delivered to various exhaust gas after treatment devices such as the close-coupled catalytic converter 138 for oxidation, reduction or other conversion of regulated exhaust gas constituents in the combustion by-products prior to their release to the atmosphere.

In an exemplary embodiment, and referring to the inline configured 2 cylinder engine 2 of FIG. 1, the angling of the upper end 18 of engine block assembly 12 facilitates the angling or laying back of the cylinder housing assembly 72 for the purposes of packaging the engine 2 in an efficient manner in a vehicle 139. In the embodiment illustrated in FIG. 1, the rearward bank angle β of the cylinder housing assembly 72 is about 70° from vertical. It is contemplated that the rearward bank angle β may vary from about 30° to about 90° depending upon the particular vehicle configuration and other application driven variables. With such a configuration, the 2-cylinder engine 2 is packageable in virtually any vehicle platform or configuration.

In another exemplary embodiment, and referring to the V-configured 3 cylinder engine 3, FIGS. 2, 3 and 5, the third engine cylinder and cylinder housing assembly 118 is preferably oriented at an angle "γ" that is about 90 degrees from the two inline cylinders of the cylinder housing assembly 72 respectively. It is contemplated that the angle "γ" may vary from about 25° to about 115°; again depending upon the particular vehicle configuration and other application driven variables. In the particular embodiment shown the angle "γ" is in the range of about 90°. Such an orientation, as is illustrated in FIG. 3 will allow the V-configured 3-cylinder engine 3 to maintain the low profile achieved by the inline 2-cylinder engine 2 while providing extra power that may be required for certain applications. The single, relatively upright oriented single cylinder housing assembly 118 is small enough and relatively centrally located so as to partially package in a portion of a floor pan tunnel 140 of vehicle 139 resulting in the same vehicle packaging and interior space benefits that are realized with the inline 2-cylinder engine 2 described above.

Figure 4:
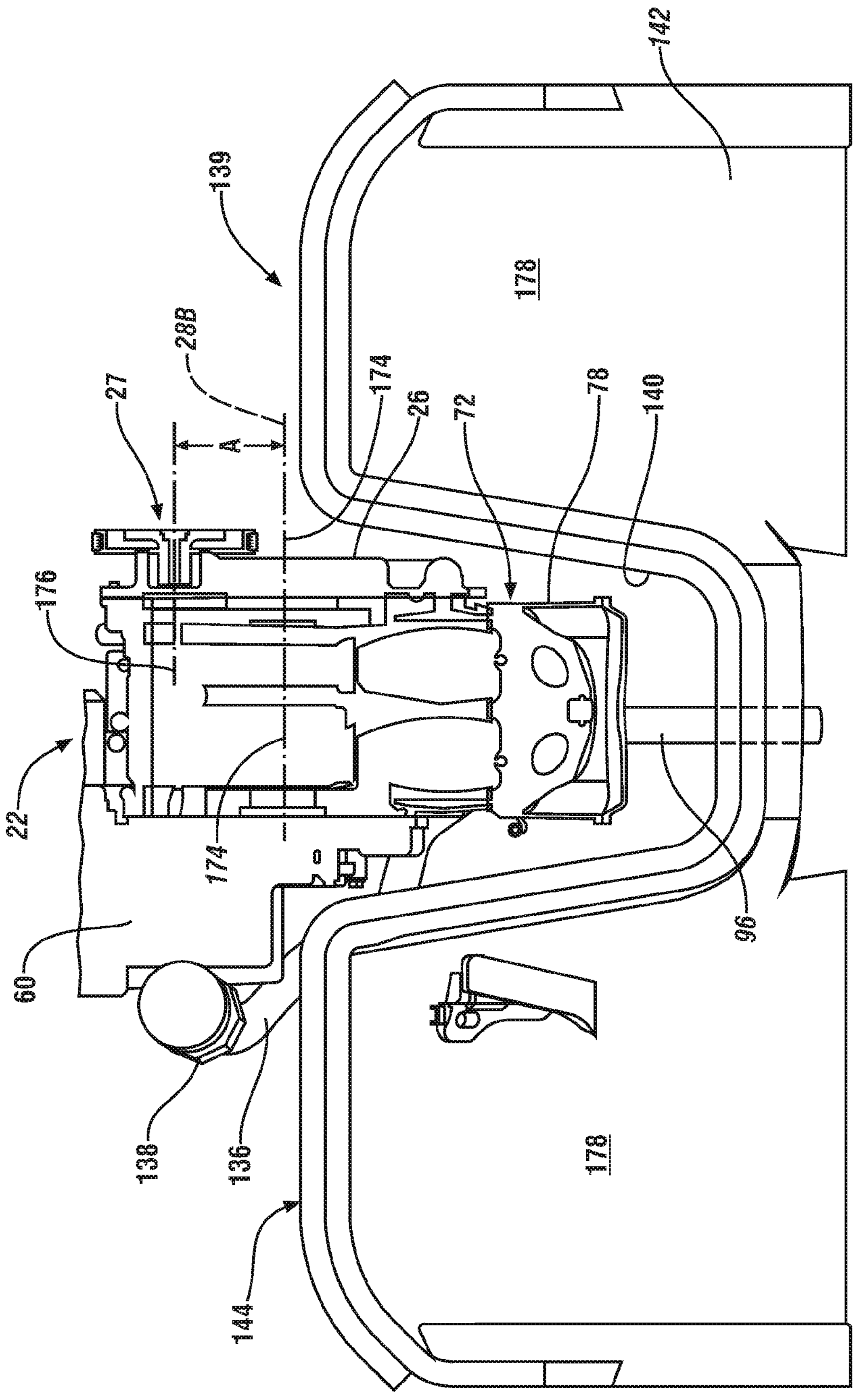
FIG. 4 is a sectional view of the V-configured 3-cylinder engine and partial vehicle installation taken along line 4-4 of FIG. 3.
Figure 6:
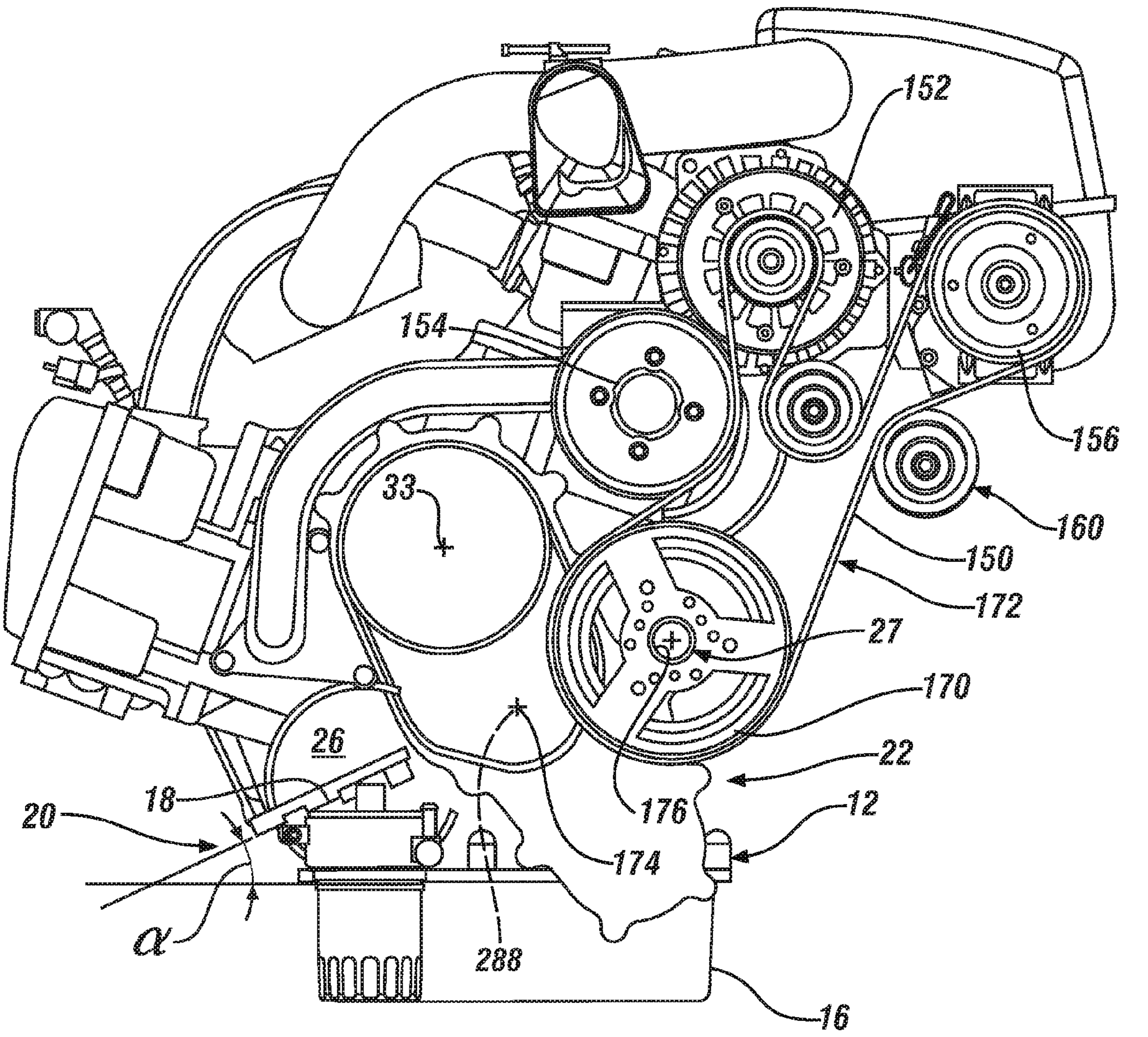
FIG. 6 is side view of yet another embodiment of a V-configured 3-cylinder engine embodying features of the invention.

Referring to FIGS. 3, 4 and 6, the engine 3 is illustrated in relationship to the central tunnel 140 located at an end of a vehicle floor pan 142 of a motor vehicle 139. In the packaging configuration shown, the cylinder head housing assembly 72, the intake manifold 80, the exhaust system conduit 96 and a significant portion of the engine crankcase 26 are packaged within the central tunnel 140 of the vehicle floor pan 142. An advantage to packaging the engines 2 and 3 in the configuration shown is that the vehicle bulkhead 144 may be moved forward, in comparison to vehicles using conventionally configured inline engines (1-4 or 1-6) in which the bulkhead position is, in large part, limited by the near-vertical engine block and cylinder head assemblies. The result of the packaging configuration disclosed herein is that the location of the bulkhead 144 is less constrained by the location and configuration of the internal combustion engine, 2 or 3, allowing for greater interior space 178 to be provided for the passengers of the motor vehicle 139 (i.e. the bulkhead is moved forward without penalty).

The width of the central tunnel 140 of the vehicle floor pan 142 is directly related to the width of the engine package. As a result, the wider the central tunnel 140, the wider and heavier the motor vehicle 139. Referring to FIGS. 4 and 6, in yet another exemplary embodiment of the V-configured 3-cylinder engine 3, the balance shaft 27, which is offset from the crankshaft 28B towards the front 22 of the engine 3 and away from the central tunnel 140, extends outwardly of the engine block assembly 12 and supports a balance shaft drive pulley 170 thereon. The balance shaft drive pulley 170 is connected via an accessory drive belt 150 to a plurality of engine driven accessories such as an alternator 152, an air conditioner compressor 154, an air pump 156 or a combination thereof. Tensioner assembly 160 provides tension and directs the accessory drive belt 150 in a serpentine manner enabling it to impart rotation on the various accessories through the rotation of the crankshaft balance shaft 27 and the and the balance shaft drive pulley 170. By moving the accessory drive pulley from the crankshaft 28B to the balance shaft 27 (a distance between the crankshaft axis 174 of the crankshaft 28B and the balance shaft axis 176 of the balance shaft 27) the entire accessory drive package 172 is located out of the central tunnel 140 of the vehicle floor pan 142 allowing for a reduction in the width of the central tunnel 140.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the present application.

What is claimed is:

1. A motor vehicle having an internal combustion engine mounted in a central tunnel of a vehicle floor pan of the motor vehicle, the internal combustion engine comprising:

an engine block assembly having a lower end closed by an oil pan and an upper end extending at an angle α relative to the lower end from a rear of the engine block assembly to a front thereof, such that the upper end of the engine block assembly is angled relative to the lower end of the engine block assembly;

an engine block closing the upper end of the engine block assembly and defining a crankcase that is configured to house a crankshaft for rotation therein; and a cylinder housing assembly reclined from vertical, towards the rear of the engine block, about an axis of the crankshaft by an angle β, wherein at least a portion of the cylinder housing assembly and the crankcase are disposed in the central tunnel of the vehicle floor pan;

wherein at least one balance shaft is offset from the crankshaft towards the front of the engine block assembly and away from the central tunnel and supports a balance shaft drive pulley thereon.

2. The motor vehicle of claim 1, wherein the angle α is within a range of 0 degrees to 45 degrees.

3. The motor vehicle of claim 2, wherein the angle α is approximately 45 degrees.

4. The motor vehicle of claim 1, wherein the angle β is within a range of 30 degrees to 90 degrees.

5. The motor vehicle of claim 4, wherein the angle β is approximately 70 degrees.

6. The motor vehicle of claim 1, further comprising a second cylinder housing assembly oriented an angle γ, about an axis of the crankshaft, from a first cylinder housing assembly.

7. The motor vehicle of claim 6, wherein at least a portion of the second cylinder housing assembly is disposed in the central tunnel of the vehicle floor pan.

8. The motor vehicle of claim 6, wherein the angle γ is within a range of 25 degrees to 115 degrees.

9. The motor vehicle of claim 8, wherein the angle γ is approximately 90 degrees.

10. The motor vehicle of claim 1, wherein at least one balance shaft is offset from the crankshaft towards the front of the internal combustion engine and away from the central tunnel and supports a balance shaft drive pulley thereon.

11. The motor vehicle of claim 10, wherein the balance shaft drive pulley is connected via an accessory drive belt to a plurality of engine driven accessories, the balance shaft drive pulley located outside of the central tunnel of the vehicle floor pan.

12. A motor vehicle comprising:

a vehicle floor pan;

a central tunnel defined at an end of the vehicle floor pan;

an internal combustion engine mounted in the central tunnel of the vehicle floor pan, the internal combustion engine comprising:

an engine block assembly having a lower end closed by an oil pan and an upper end extending at an angle α relative to the lower end from a rear of the engine block assembly to a front thereof, such that the upper end of the engine block assembly is angled relative to the lower end of the engine block assembly;

an engine block closing the upper end of the engine block assembly and defining a crankcase that is configured to house a crankshaft for rotation therein; and a cylinder housing assembly reclined from vertical, towards the rear of the engine block, about an axis of the crankshaft by an angle β, wherein at least a portion of the cylinder housing assembly and the crankcase are disposed in the central tunnel of the vehicle floor pan;

wherein at least one balance shaft is offset from the crankshaft towards the front of the engine block assembly and away from the central tunnel and supports a balance shaft drive pulley thereon.

13. The motor vehicle of claim 6, further comprising:

a second cylinder housing assembly oriented an angle γ, about an axis of the crankshaft, from the first cylinder housing assembly wherein at least a portion of the second cylinder housing assembly is disposed in the central tunnel of the vehicle floor pan.

14. The motor vehicle of claim 12, wherein the balance shaft drive pulley is connected via an accessory drive belt to one or more engine driven accessories.

15. The motor vehicle of claim 14, wherein the balance shaft drive pulley is connected via an accessory drive belt to a plurality of engine driven accessories, the balance shaft drive pulley located outside of the central tunnel of the vehicle floor pan.

16. The motor vehicle of claim 1, wherein the lower end is disposed substantially horizontally.

17. A motor vehicle having an internal combustion engine mounted in a central tunnel of a vehicle floor pan of the motor vehicle, the internal combustion engine comprising:

an engine block assembly having a lower end closed by an oil pan and an upper end extending at an angle α relative to horizontal from a rear of the engine block assembly to a front thereof, such that the upper end of the engine block assembly is angled relative to the lower end of the engine block assembly;

an engine block closing the upper end of the engine block assembly and defining a crankcase that is configured to house a crankshaft for rotation therein; and a cylinder housing assembly reclined from vertical, towards the rear of the engine block, about an axis of the crankshaft by an angle β, wherein at least a portion of the cylinder housing assembly and the crankcase are disposed in the central tunnel of the vehicle floor pan;

wherein at least one balance shaft is offset from the crankshaft towards the front of the engine block assembly and away from the central tunnel and supports a balance shaft drive pulley thereon.

18. The motor vehicle of claim 1, wherein the cylinder housing assembly and the crankcase are disposed within the central tunnel.

19. The motor vehicle of claim 6, wherein a first cylinder and a second cylinder are disposed within the first cylinder housing assembly, and wherein a third cylinder is disposed within the second cylinder housing assembly.

20. The motor vehicle of claim 1, wherein the crankshaft comprises a crank snout that extends outwardly of the front of the engine block assembly and supports a crankshaft pulley thereon, and wherein the crankshaft pulley is connected via an accessory drive belt to one or more engine driven accessories.

* * * * *